W. E. SHORE.
DEVICE FOR IMPROVING FUEL COMBUSTION IN STOVES.
APPLICATION FILED NOV. 3, 1913.
1,173,047.
Patented Feb. 22, 1916.
2 SHEETS—SHEET 1.
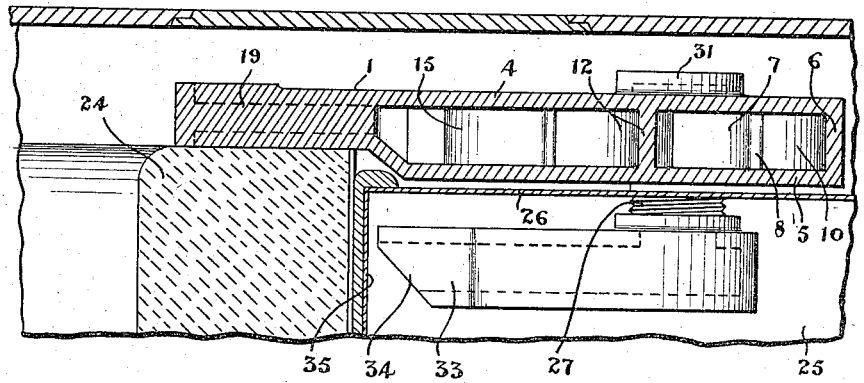
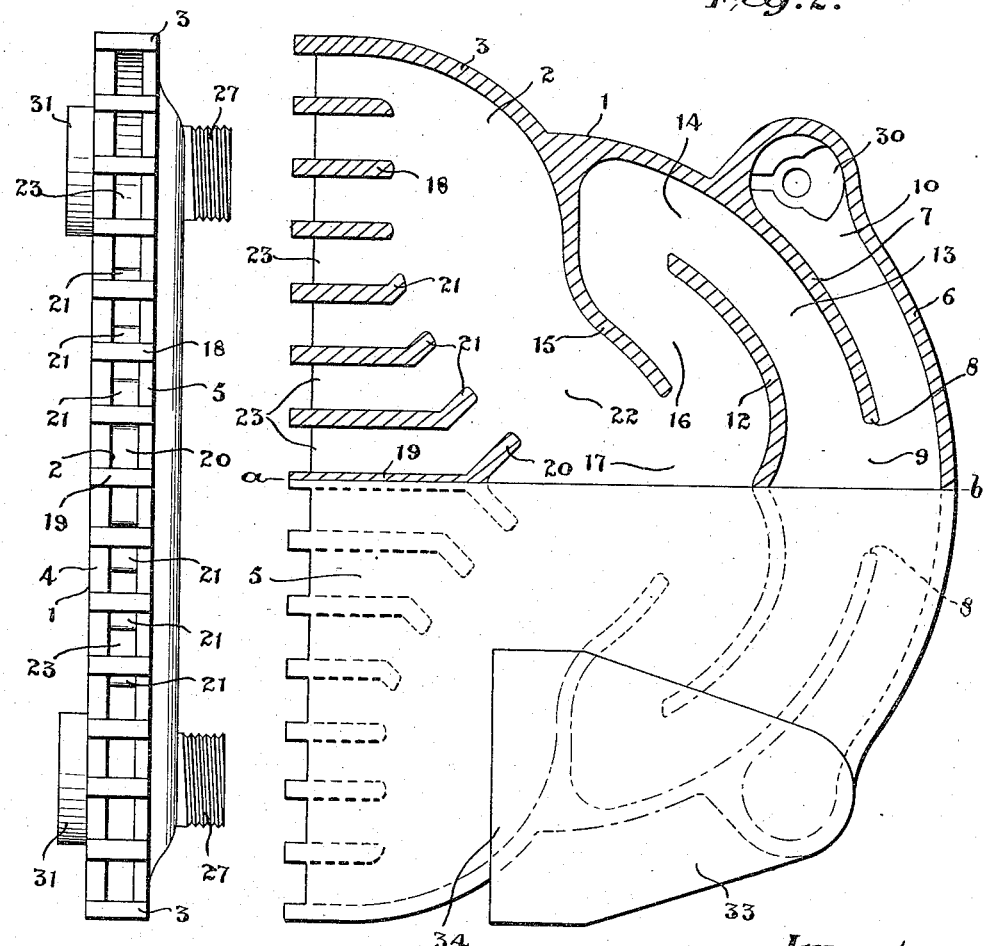

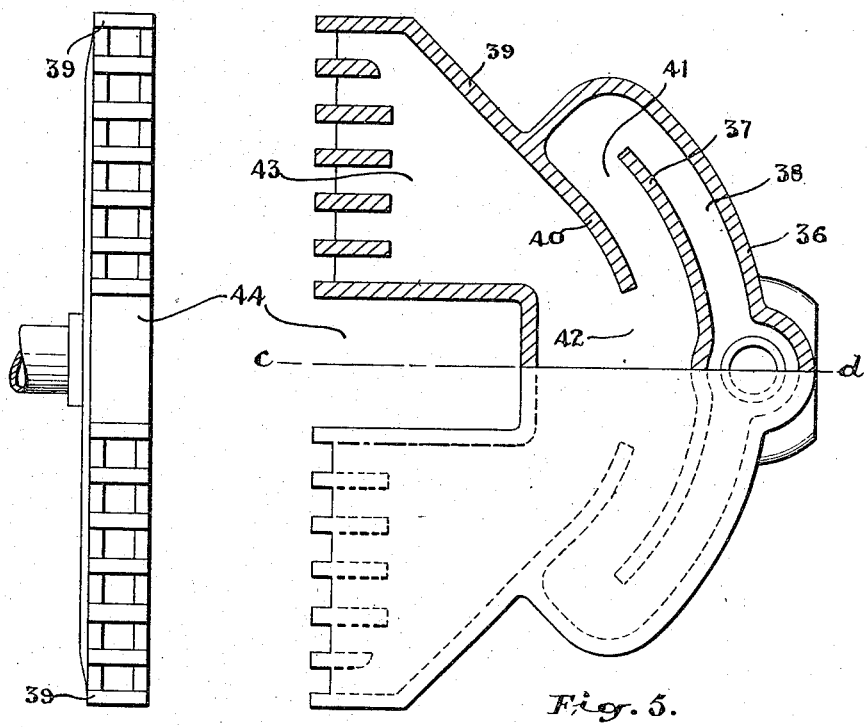
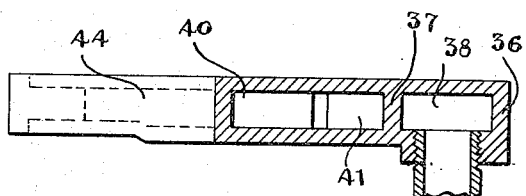
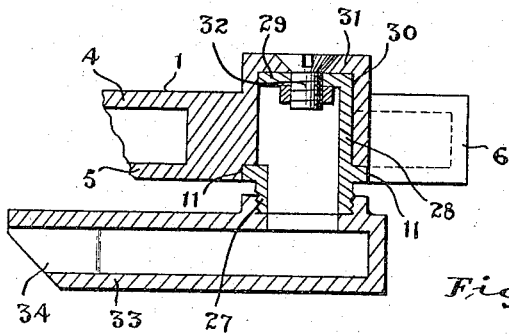

UNITED STATES PATENT OFFICE.

WILLIAM E. SHORE, OF NEW YORK, N. Y., ASSIGNOR TO COMBUSTO DEVICES CORPORATION, A CORPORATION OF NEW YORK.

DEVICE FOR IMPROVING FUEL COMBUSTION IN STOVES.

1,173,047.  Specification of Letters Patent.  Patented Feb. 22, 1916.

Application filed November 3, 1913. Serial No. 799,002.

*To all whom it may concern:*

Be it known that I, WILLIAM E. SHORE, a subject of the King of Great Britain, and resident of the city of New York, State of New York, one of the United States of America, have invented certain new and useful Improvements in Devices for Improving Fuel Combustion in Stoves, as described in the following specification and illustrated in the accompanying drawings, that form part of the same.

The principal objects of the invention are, to improve the combustion of fuel in stoves, utilizing to the maximum the thermal units in the fuel, thereby effecting great economy in fuel consumption, and to devise a novel form of air super-heating device which will deliver super-heated air into the combustion chamber of the stove to mingle with the gases of combustion rising from the fuel in the most effective manner causing the complete consumption of all the combustible matter.

A further object is to effect a more uniform distribution of temperatures throughout the combustion chamber, thereby greatly facilitating the heating efficiency of the stove.

The principal feature of the invention consists in the novel construction of an air super-heating device whereby the supply of air in its passage therethrough is subjected to increasing temperatures and heating areas being directed through passages of increasing sizes allowing free expansion, the super-heated and expanded air being delivered to the combustion chamber in a uniform volume spread over a large area and whereby the natural flow of the air due to expansion is assisted materially by the formation of the air passages.

In the drawings, Figure 1 is an underside plan view of my improved device shown in part section. Fig. 2 is a vertical mid-sectional view of my device taken through the line *a—b* Fig. 1 and showing it applied to a stove. Fig. 3 is a front edge elevational view of the device. Fig. 4 is a vertical sectional detail through one of the nipple connections to the oven showing the hot air collector attached. Fig. 5 is a plan view in part section of a slightly modified form of my device. Fig. 6 is a central vertical sectional view through the line *c—d* Fig. 5.

Fig. 7 is a front elevational view of the device illustrated in Fig. 5.

Like numerals of reference indicate corresponding parts in each figure.

In the form of the device shown in Figs. 1, 2 and 3 which is particularly adapted for large ranges but may be made of any desirable size, 1 is a casing preferably of cast iron formed broad at the front edge 2 and having side walls 3 converging inwardly toward the rear. The top and bottom walls 4 and 5 are formed integrally with the side walls 3. The rear wall 6 is preferably formed arc shape in plan and arranged substantially parallel with said rear wall are a pair of walls 7 extending inwardly from the side walls 3, the side walls at the point of juncture with the walls 7 being preferably formed to continue the arc shape thereof. The inner ends 8 of the walls 7 are spaced apart forming the passage 9 therebetween communicating with the passages 10 between the walls 6 and 7.

The numeral 11 designates circular holes in the bottom wall 5 arranged at the outer and terminal ends of the passages 10 through which the air supply is adapted to flow.

The numeral 12 designates a pair of arc shaped walls extending between the top and bottom walls 4 and 5, substantially parallel to the walls 7 and spaced therefrom forming passages 13 of slightly greater width than the passages 10. The inner ends of the walls 12 are curved forward in a short arc and meet centrally of the width of the casing and the outer ends terminate short of the outer wall of the casing leaving passages 14 around the ends. The forward ends of the side walls 3 are curved in arc shape to meet the arc shaped side extensions of the walls 7 and are contained inwardly between the top and bottom walls of the casing forming the passages 14 connecting with the passages 13. The inner ends 15 being curved substantially parallel to the outer ends of the walls 12 form inwardly curved passages 16 communicating with the passages 14 and of greater width than the passages 13.

17 is a centrally arranged passage between the inner ends of the walls 15 and communicating with the passages 16. The curve of the innermost ends of the walls 12 is such that if extended beyond the meeting point such walls would form a continuation of the inwardly extending walls 15 and thus the flow of air through the passages 16 will be directed to the outer or forward side of the walls 15, the flow from each side intermingling.

The front side of the casing 1 is open and arranged between the top and bottom walls are a plurality of vertical ribs 18. A central rib 19 extends a considerable distance into the casing and the inner end is formed with a bifurcated end 20. The ribs adjacent to the central rib are of slightly shorter length than said central rib and are formed with outwardly turned inner ends 21 and each of the next succeeding ribs are formed slightly shorter and with correspondingly angularly turned inner ends.

The passages 22 formed between the extremities of the bifurcated ends of the central rib 19 and the curved walls 15 are of greater width than the passage 16 and as the successive ribs 18 are of shorter length as they extend toward the outer wall of the casing, the passage between the inner ends thereof and the outer wall continues to increase.

The ribs 18 are perpendicularly arranged and extend parallel the one to the other, thus forming a plurality of narrow passage-ways 23 leading outwardly from the expanding passages 22, the innermost passage adjacent to the center rib being the longest and the succeeding passages being of gradually decreasing length. This arrangement of the passages 23 is provided to insure the uniform distribution of the air from the interior of the casing through the exit openings for the complete width of the casing. The casing is placed within a stove or range with the forward end, which is preferably made shallower than the rear portion, resting upon the top edge of the fire brick lining 24 of the fire pot. The rear end extends over the oven 25 and the oven top 26 is provided with a pair of holes leading through to the oven arranged opposite to the holes 11 in the underside of the casing.

27 are nipple connections extending downwardly from the holes 11 in the casing 1 and through the oven top, said connections being preferably secured in the casing 1 by an upwardly extending lug 28 having a laterally projecting upper end 29 which fits into a socket recess 30 in the underside of the boss 31 formed in the top of the casing 1 over each of the holes 11, a bolt 32 extending through the end 29.

33 are a pair of flat casings secured to the inwardly extending ends of the nipple 27 within the oven and closed at the back end and extending forwardly and flaring outwardly to the open front end 34.

The collector casings are arranged close to the top of the oven and the forward ends extend into close proximity with the inner front wall 35 of the oven. The front edge of said collector casings is preferably beveled on the underside presenting a free opening so that the heated air rising within the oven and back of the fire pot will flow into the collector casings and from there pass into the casing 1 through the nipple connections 27. By arranging the collector casings in this manner the supply of warmest air is obtained within the oven even though there may be a very low fire in the stove. The gases of combustion rising from the fire pot pass over the top of the casing 1 in their passage to the flue and coming in contact first with the forwardly extending edge of the device provided with a plurality of vertical ribs impart thereto a considerable amount of heat. As the gases travel backward from the stove toward the flue they become cooler consequently the temperature of the back end of the casing will be considerably lower than that of the front end.

The air flowing into the passages 10 in the casing 1 is directed inwardly by the walls 7 and the currents meeting cause the thorough mixing and intermingling thereof and the flow is directed through the passage 10 into the outwardly turned passages 13. The passages 13 are of greater area than the passages 10 to allow for the expansion of the air through contact with the heated surfaces of the casing 1. The current of air through the passages 13 is directed by the walls 15 through passages 14 and 16 and the inner arc shaped ends of the deflecting walls 12 direct the flow outwardly past the inwardly extending ends of the walls 15.

The currents are divided each side of the bifurcated central rib 19 and as the passages between the parallelly arranged ribs 18 are longest nearest the center the resistance to the outward flow of the air will be greater than at the outer sides of the casing where the ribs 18 are very short in length, consequently the flow of air through the passages 22 will be uniformly distributed in its outward flow through the open front edge of the casing 1.

As the air in its passage from the rear to the front of the casing comes in contact with the heated walls it is expanded and as the passages increase in width from the rear to the front this expansion takes place freely without affecting the inward flow of air at the rear end and owing to the peculiar flaring formation of the casing the air as it travels forward is brought into contact with a greatly increased heated area of metal, consequently it is subjected to an increasing temperature and an increasing expansion, being finally discharged through a plurality of narrow passages where it comes into contact with the further heat radiating surfaces of the ribs 18 which are heated to a greater temperature than any portion of the device owing to their close proximity with the fire pot, consequently the air is discharged into the combustion chamber in a highly rarified and expanded state and it therefore mingles with the gases of combustion at a temperature practically the same as such gases, consequently affecting the complete consumption of any combustible particles in suspension in such gases. It will therefore be readily apparent that a secondary combustion takes place in the upper portion of the combustion chamber that is to say, in the space between the top of the oven and the top of the stove. The result of this secondary combustion is that the top of the stove and also the oven is subjected to the heating effect of the active burning gases and not simply to the heating effect of hot gases rising from the burning fuel in the fire pot.

I am aware that many forms of apparatus for introducing air into the combustion chamber in stoves have been devised but as far as I am aware none of these have produced a device in which the supply of air is subjected to an increase in temperature conditions within the super-heater and also allowed to expand uniformly from the point of entry to its discharge and as these features achieve in actual practice a very marked improvement and result the device is a distinct improvement in the art.

The modification of the device shown in Figs. 5, 6 and 7 is only slightly different in that it is adapted for the ordinary small cook stoves and with such stoves a single inlet opening is all that is required. In this form the rear wall 36 is of arc shape and an arc shaped wall 37 is spaced parallel therefrom forming a passage 38. The side walls 39 converge inwardly from the front of the casing and have inwardly projecting ends 40 arranged parallel to the wall 37 and form passages 41 of greater width than the passage 38, the rear wall 36 being curved inwardly beyond the ends of the wall 37 to meet the converging side walls.

The inwardly projecting ends 40 of the side walls form a central passage 42 through which the air is directed into the laterally extending chambers 43 arranged on each side of the central indentation or notch 44 in the front of the casing, said indentation being formed to receive the central post supporting the stove top thus allowing the device to be placed centrally within the stove and to discharge the super-heated air directly over the fire pot. The front edge in this form of the casing is open as in the forms shown in the other figures and provided with a plurality of vertical parallel ribs. These ribs not only provide final heating surfaces for the air but also reinforce the casing in such a manner as to prevent warping and cracking through the intense heat.

What I claim as my invention is:—

1. In a device of the class described, the combination with the oven and the combustion chamber extending thereover, of a broad flat casing arranged within the combustion chamber over the oven inclosing an air superheating chamber and having an inlet opening at the rear end communicating with the oven and a discharge in the front end adjacent to the fire box (the discharge end being of considerably greater width than the inlet end), perpendicular division walls arranged within the interior of said casing and dividing same into a plurality of intercommunicating passages increasing in cross-sectional area from the inlet, and a plurality of vertical division walls extending inwardly from the front of the casing and forming a plurality of narrow passages communicating with the foremost heating chamber, said walls being parallelly arranged and of gradually increasing length from the outer sides to the center.

2. In a device of the class described, the combination with the oven and the combustion chamber extending thereover, of a casing arranged within the combustion chamber over the oven inclosing an air superheating chamber and having a discharge opening in the front and an inlet opening in the bottom side at the rear, a conduit projecting downwardly from said inlet opening and extending into the oven, and an air collecting chamber connected to said conduit within the oven.

3. In a device of the class described, the combination with the oven and the combustion chamber extending thereover, of a casing arranged within the combustion chamber over the oven inclosing an air superheating chamber and having a discharge opening in the front and an inlet opening in the bottom side at the rear, a conduit projecting downwardly from said inlet opening and extending into the oven, and a flat air collecting casing secured to the end of said conduit within the oven and flaring outwardly therefrom and having its broad end open to receive a supply of air.

4. An attachment for stoves, comprising, a broad flat casing adapted to be secured to the top of the oven plate and having an opening in the bottom side at the end farthest from the firebox and communicating with an opening in the top plate of the oven, said casing having a plurality of passages in its front side arranged in a plane above the inlet from the oven, said passages diminishing in length from the center to the sides of the casing and adapted to direct the expanded and superheated air into the combustion chamber of the stove.

5. A device for promoting combustion in stoves and the like, comprising a casing having an air inlet opening and baffle plates having spaced ends forming passages whereby the spaces between the baffle plates are placed in intercommunication and a plurality of outlet passages at the front side of the casing, said passages diminishing in length from the center to the sides of the casing.

6. A device for promoting combustion in stoves and the like, comprising a casing having an air inlet opening, baffle plates within the casing having passages between them, whereby the spaces between the baffle plates are placed in intercommunication, said baffle plates being arranged so as to direct the incoming air backwardly toward the point of inlet for a portion of its travel and a plurality of outlet passages in the front end of the casing, said passages diminishing in length from the center to the sides of the casing.

7. A device for promoting combustion in stoves and the like, comprising a casing adapted for attachment within the combustion chamber over the oven, said casing having a broad front adjacent to the fire box and side walls converging rearwardly, an air inlet communicating with the oven at the rear end of the casing, said casing having a series of perpendicular walls forming curved passages leading from the inlet and being closed and opened alternately at their ends and centers respectively, and formed increasing in sectional area toward the front, the foremost passage opening centrally into a diverging distributing chamber, outlet passages at the front of the casing through which the superheated and expanded air is directed into the fire box over the fire, said passages diminishing in length from the center to the sides of the casing.

8. An attachment for stoves for promoting combustion therein, and for use in connection with the combustion chamber thereof, comprising a casing having an air inlet opening and baffle plates having spaced ends, forming passages, whereby the spaces between the baffle plates are placed in intercommunication, and a plurality of outlet passages at the front of the casing, formed by vertical heat conducting walls extending back into the casing, whereby additional heat radiating surfaces are provided for further superheating the air as it passes out of the outlet passages.

Signed at the city of New York, State of New York, one of the United States of America, this 21st day of October, 1913.

WILLIAM E. SHORE.

Witnesses:
BELLE I. MORRIS,
WM. D. ELGER.

Copies of this patent may be obtained for five cents each, by addressing the "Commissioner of Patents, Washington, D. C."